United States Patent
Tsai et al.

(10) Patent No.: US 11,783,095 B2
(45) Date of Patent: Oct. 10, 2023

(54) SYSTEM AND METHOD FOR MANAGING SECURE FILES IN MEMORY

(71) Applicant: CrowdStrike, Inc., Sunnyvale, CA (US)

(72) Inventors: Artsiom Tsai, San Jose, CA (US); Joshua Jones, Livermore, CA (US); Andrey Redko, Moscow (RU)

(73) Assignee: CrowdStrike, Inc., Sunnyvale, CA (US)

( * ) Notice: Subject to any disclaimer, the term of this patent is extended or adjusted under 35 U.S.C. 154(b) by 116 days.

(21) Appl. No.: 17/352,761

(22) Filed: Jun. 21, 2021

(65) Prior Publication Data

US 2022/0405431 A1   Dec. 22, 2022

(51) Int. Cl.
*G06F 21/78* (2013.01)
*G06F 21/12* (2013.01)
*G06F 21/60* (2013.01)
*G06F 21/62* (2013.01)

(52) U.S. Cl.
CPC ............ *G06F 21/78* (2013.01); *G06F 21/121* (2013.01); *G06F 21/604* (2013.01); *G06F 21/6209* (2013.01)

(58) Field of Classification Search
CPC ...... G06F 21/78; G06F 21/121; G06F 21/604; G06F 21/6209; G06F 21/74; G06F 21/6218; G06F 12/109; G06F 12/1408; G06F 12/1441; G06F 12/1483; G06F 2212/1052; G06F 2212/657; G06F 2212/7201
See application file for complete search history.

(56) References Cited

U.S. PATENT DOCUMENTS

| | | | |
|---|---|---|---|
| 6,272,631 B1 | 8/2001 | Thomlinson et al. | |
| 9,235,526 B2 | 1/2016 | Klein | |
| 9,916,095 B2 | 3/2018 | Stabrawa et al. | |
| 10,033,700 B2 | 7/2018 | Ouye et al. | |
| 10,229,279 B2 | 3/2019 | Garcia et al. | |
| 10,592,680 B2 * | 3/2020 | Shaw | G06F 21/6218 |
| 10,929,523 B2 | 2/2021 | Ryu et al. | |

(Continued)

OTHER PUBLICATIONS

Randy Kath; Managing Memory-Mapped Files; Created Feb. 9, 1993, posted to Microsoft Docs Jun. 30, 2010; downloaded from: https://docs.microsoft.com/en-us/previous-versions/ms810613(v=msdn.10)—(21) pages.

(Continued)

*Primary Examiner* — Han Yang
(74) *Attorney, Agent, or Firm* — Lee & Hayes, P.C.

(57) ABSTRACT

A data access manager is provided on a computing device to manage access to secure files stored in memory. The data access manager intercepts function calls from applications to the memory management unit and determines whether an application is allowed to access secure data stored in the memory of the computing device. When an initial request to map the data is received, the data access manager maps both secure data and clear data, obtaining pointers to both secure and clear data. When an application has permission to access the requested data, the data access manager returns the pointer to the clear data. When an application does not have permission to access the requested data, the data access manager returns the pointer to the secure data.

18 Claims, 5 Drawing Sheets

(56) References Cited

U.S. PATENT DOCUMENTS

2011/0289294 A1\* 11/2011 Maeda ............... G06F 12/1491
711/163
2017/0185531 A9\* 6/2017 Chen .................. G06F 21/6218
2017/0344496 A1\* 11/2017 Chen .................. G06F 21/6218

OTHER PUBLICATIONS

"Memory-mapped files", posted to Microsoft Docs Mar. 30, 2017, downloaded from: https://docs.microsoft.com/en-us/dotnet/standard/io/memory-mapped-files—(11) pages.

\* cited by examiner

SYSTEM AND METHOD FOR MANAGING SECURE FILES IN MEMORY

FIELD OF THE INVENTION

The subject matter disclosed herein relates to a system and method for managing secure files when they are mapped to memory and, in particular, to a system and method which maintains secure access to a file after it has been mapped into memory by an allowed application to prevent subsequent access by a disallowed application.

BACKGROUND OF THE INVENTION

Managing access to a company's electronic data presents a number of challenges. Historically, it is known to utilize data rights management (DRM) software to establish an initial level of security for access to the electronic data. DRM software commonly requires a user to provide credentials, such as a user name and password. The DRM software may further employ two-step authentication, requiring, for example, the user to receive a code from the DRM software via a text message and subsequently enter that code to verify a user's identity. The DRM software may employ still other restrictions such as limiting access to data to a predefined list of devices or during a certain time of the day. Further the DRM software may utilize encryption techniques to encrypt electronic data prior to storing the data on a storage device. Each of the measures employed by the DRM software provides an initial level of security for the electronic data.

The limitations placed by the DRM software on accessing data restrict an application from initially accessing that data. The data is commonly stored on a data storage device, such as a remote server or a local storage device, which may include one or more fixed or removable storage devices such as hard-drives, solid-state drives, CD drives, DVD drives, USB drives, memory cards or the like. Read and/or write access to this data is slow when compared, for example, to accessing data from memory. The computing device will commonly copy either a portion of a file or even the entire file into memory for rapid read and/or write access to the data while an application is utilizing the data. The data is commonly copied to a memory location with shared access between different applications. A memory management unit on the computing device controls storage of the data into the memory and provides pointers back to the application for subsequent access to the memory.

While the DRM software may be configured to provide an initial level of security, the potential still exists for unauthorized access to data protected by the DRM software. Once the data has been copied from the data storage device to memory, additional applications executing on the same device may request access to the same data. The memory management unit first checks if the requested data has already been copied from the data storage device to memory. When the data has already been copied to memory, the memory management unit returns a pointer to the additional application providing access to the location of the stored data without creating a second copy of the data in memory. The memory management unit then controls access to this data between the two applications such that both applications are not attempting to write to the same location at the same time. The memory management unit, however, is typically not configured to check the access rights as established by the DRM software. The DRM software manages access to data on the data storage device. Because the data has already been copied to shared memory, a second application, which would not have access to the data based on the rights configured in the DSM software may now have access to the data stored locally in the shared memory.

Thus, it would be desirable to provide an improved system for managing access to secure files stored in memory.

BRIEF DESCRIPTION OF THE INVENTION

The subject matter disclosed herein describes an improved system for managing access to secure files stored in memory. A data access manager is provided on the computing device. The data access manager may be, for example, a process executed on power up and executable by the host operating system. The data access manager intercepts function calls from applications to the memory management unit and determines whether an application is allowed to access secure data stored in the memory of the computing device.

An initial function call from an application to the memory management unit is used to map data to memory. The initial function call may, for example, identify a data file or data from a data file to which the application is requesting access. The data access manager is configured to intercept the function call before it is received by the memory management unit and to determine whether the calling application has permission to access the data file. The data access manager may utilize a local data rights management (DRM) software executing on the computing device. The DRM software may store login credentials, such as a user name and password and include a database defining file access rights associated with the login credentials. It is contemplated that still other forms of DRM software may be executing on the computing device without deviating from the scope of the present invention.

When the data access manager determines that the application is allowed to access the requested data, the data access manager coordinates the required steps to copy the data from the data file into memory for subsequent access. The data access manager requests that the memory management unit map the data into memory. If the data is encrypted, the data access manager may first request a copy of the encrypted data and store the encrypted data in a first memory location. The data access manager may call a decryption module to decrypt the data and then instruct the memory management unit to store the decrypted data in a second memory location for ready access. The memory management unit generates a pointer, also referred to as a file handle, each time data is mapped to memory. Thus, the memory management unit may pass the data access manager a first pointer to secure data and a second pointer to clear data. When the calling application has permission to access the data, the data access manager returns the pointer to the clear data to the calling application such that it has access the clear data. When the data access manager determines that the application is not allowed, the data access manager passes the pointer to the encrypted data, such that it is unable to access the clear data.

After mapping the data to memory, subsequent function calls from the application to the memory management unit are generated to access the previously mapped data either for reading or writing. The data access manager is configured to intercept the function call before it is received by the memory management unit and to determine whether the calling application has permission to access the data file. When the application has permission to access the requested data or data file, the data access manager sends the memory management unit the pointer to the clear data. The memory management unit, via the data access manager provides the application access to the clear data in memory. When the application does not have permission to access the requested data or data file, the data access manager sends the memory management unit the pointer to the secure data. The memory management unit, via the data access manager provides the application access only to the encrypted data in memory. When the data is encrypted, the calling application will not be able utilize the data within the file and will return an error message with respect to the data received it attempted to access.

According to one embodiment of the invention, a method of managing access to secure data mapped into memory on a computing device receives a request to view the secure data mapped into memory. The request to view is received by a data access manager from an application executing on the computing device, and the data access manager determines whether the application is allowed to access the secure data. A first pointer is transmitted to a memory management unit when the application is not allowed to access the secure data, and a second pointer is transmitted to the memory management unit when the application is allowed to access the secure data. The first pointer directs the memory management unit to access the secure data and the second pointer directs the memory management unit to access clear data.

According to another aspect of the invention, initial steps include receiving a request to map the secure data to the memory from a data storage module communicatively coupled to the computing device. The request to map is received by the data access manager from the application, and the data access manager transmits a first request to the memory management unit to map the secure data to memory. The first pointer is received at the data access manager from the memory management unit, and the secure data is converted to clear data. The data access manager transmits a second request to the memory management unit to map the clear data to memory, and the second pointer is received at the data access manager from the memory management unit.

According to still another aspect of the invention, a second request to view the secure data mapped into memory is received, where the second request is received by the data access manager from another application executing on the computing device. The data access manager determines whether the other application is allowed to access the secure data. The first pointer is transmitted to the memory management unit when the other application is not allowed to access the secure data, and the second pointer is transmitted to the memory management unit when the other application is allowed to access the secure data.

According to another embodiment of the invention, a system for managing access to secure data on a computing device includes a memory configured to store data, a data storage module configured to store multiple files, and a processor in communication with the memory and the data storage module. The files include at least one application and at least one data file. The processor is configured to execute the application and to execute a data access manager. The application and the data access manager are operative to generate a request to access data with the at least one application, transmit the request to access data from the at least one application to a memory management unit, intercept the request to access data with the data access manager before the request is received by the memory management unit, determine whether the application is allowed to access the data with the data access manager, transmit a first pointer from the data access manager to the memory management unit when the application is not allowed to access the data, and transmit a second pointer from the data access manager to the memory management unit when the application is allowed to access the data. The first pointer directs the memory management unit to access secure data, and the second pointer directs the memory management unit to access clear data.

According to still another embodiment of the invention, a method of managing access to secure data mapped into memory on a computing device intercepts a request to map secure data into memory with a data access manager. The request is transmitted from an application executing on the computing device to a memory management unit. A first request from the data access manager to the memory management unit is issued to map the secure data into memory, and the data access manager receives a first pointer from the memory management unit. The secure data is converted to clear data. A second request from the data access manager to the memory management unit is issued to map the clear data into memory, and the data access manager receives a second pointer from the memory management unit, Both the first pointer and the second pointer are associated with the requested secure data in the data access manager, and the second pointer is returned to the application from the data access manager.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
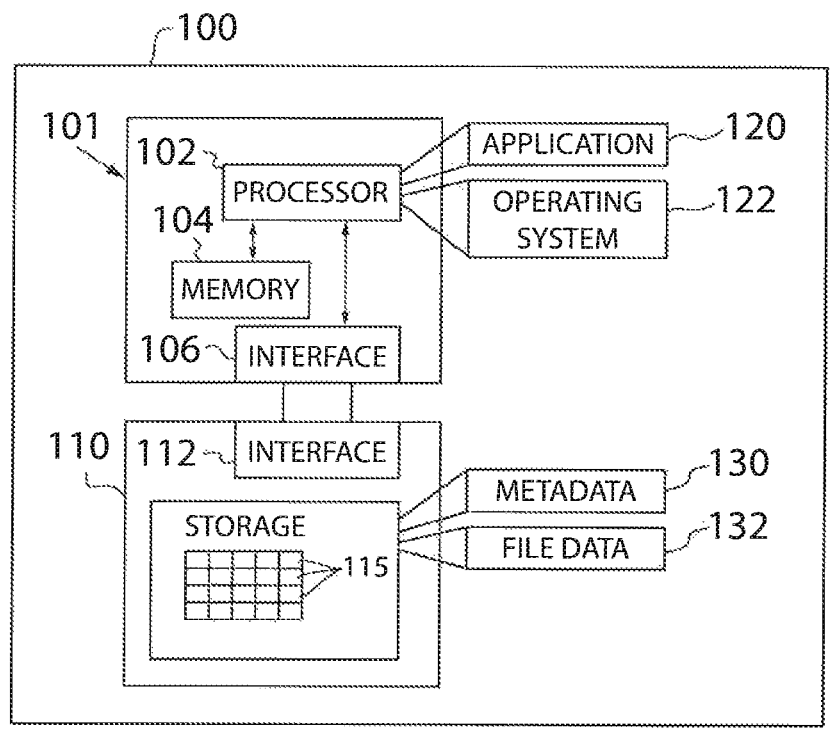
FIG. 1 is a block diagram representation of an exemplary computing device configured to incorporate one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE INVENTION

The various features and advantageous details of the subject matter disclosed herein are explained more fully with reference to the non-limiting embodiments described in detail in the following description.

Turning initially to FIG. 1, a general block diagram representing an exemplary computing device 100 is illustrated. It is understood that each computing device 100 may have various configurations and additional components to those illustrated. Further, the block diagram represents general elements of the computing device 100, and the general elements may vary between computing devices. According to the illustrated block diagram, each computing device 100 includes a processing component 101 with a processor 102 and memory 104 in communication with the processor 102. The processor 102 may include a single processor or multiple processors. The processors may operate synchronously or asynchronously. Optionally, a single processor may include multiple processing cores, where each processor and/or core may execute one or more applications 120. The memory 104 may include volatile memory, non-volatile memory, or a combination thereof. It is contemplated that at least a portion of the memory 104 is cache memory utilized for temporary storage and rapid access of data by an application 120 as the application executes, Each computing device further includes a physical data storage module 110. The data storage module 110 may be, for example, a hard drive, a solid state drive, a removable memory card, a universal serial bus (USB) storage device, and the like. A processor interface 106 and a storage interface 112 are physical layers in the processing component 101 and the data storage module 110, respectively, which establish communication between the processor 102 and the physical data storage module 110. The data storage module 110 includes block storage 114 on which data and files are saved. Each file 140 (see also FIG. 2) stored in the data storage module 110 may include metadata 130 and file data 132. The metadata 130 may include, for example, pointers to particular blocks 115 in the block storage 114 at which the file data 132 is stored.

Each computing device 100 further includes an operating system 122 to manage the resources of the computing device and to provide common services between applications 120 executing on the computing device. The operating system 122 may be stored on the data storage module 110, the memory 104 for the processing component 101, or a combination thereof. The operating system 122 may vary between computing devices and is configured to control the hardware components for the associated computing device. The operating system 122 includes a library of function calls by which an application 120 may interact with the hardware components. The library includes, for examples, functions to read from and write to the data storage module 110 or to read from and write to memory 104. The processor 102 is configured to execute the functions of the operating system 122 and to execute each of the applications 120 stored in the memory 104 or data storage module 110.

Figure 2:
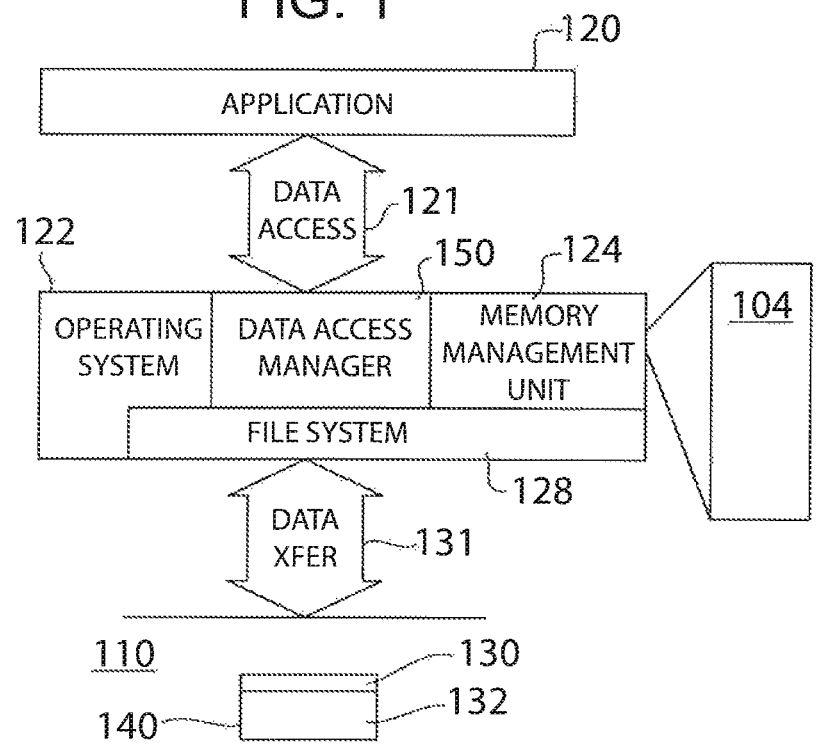
FIG. 2 is a block diagram representation of one embodiment of the invention interfacing between an application and an operating system executing on the computing device of FIG. 1.

With reference next to FIG. 2, the computing device 100 includes a data access manager 150 loaded onto the computing device and configured to interface between applications 120 and the operating system 122 to manage secure access of data files mapped to memory 104. The data access manager 150 may be a device driver, application program interface, (API), or other such routine or protocol configured to be loaded onto the computing device 100. The data access manager 150 may be stored in memory 104 for the processing component 101 or on the data storage module 110, During power-up or during initialization of the operating system 122, the operating system detects the presence of the data access manager 150 on the computing device 100 and launches the data access manager 150 so it is available when other applications 120 are executing. The data access manager 150 monitors data access requests 121 from applications and intercepts the data access request 121 before it is received by the intended recipient of the operating system.

Figure 3:
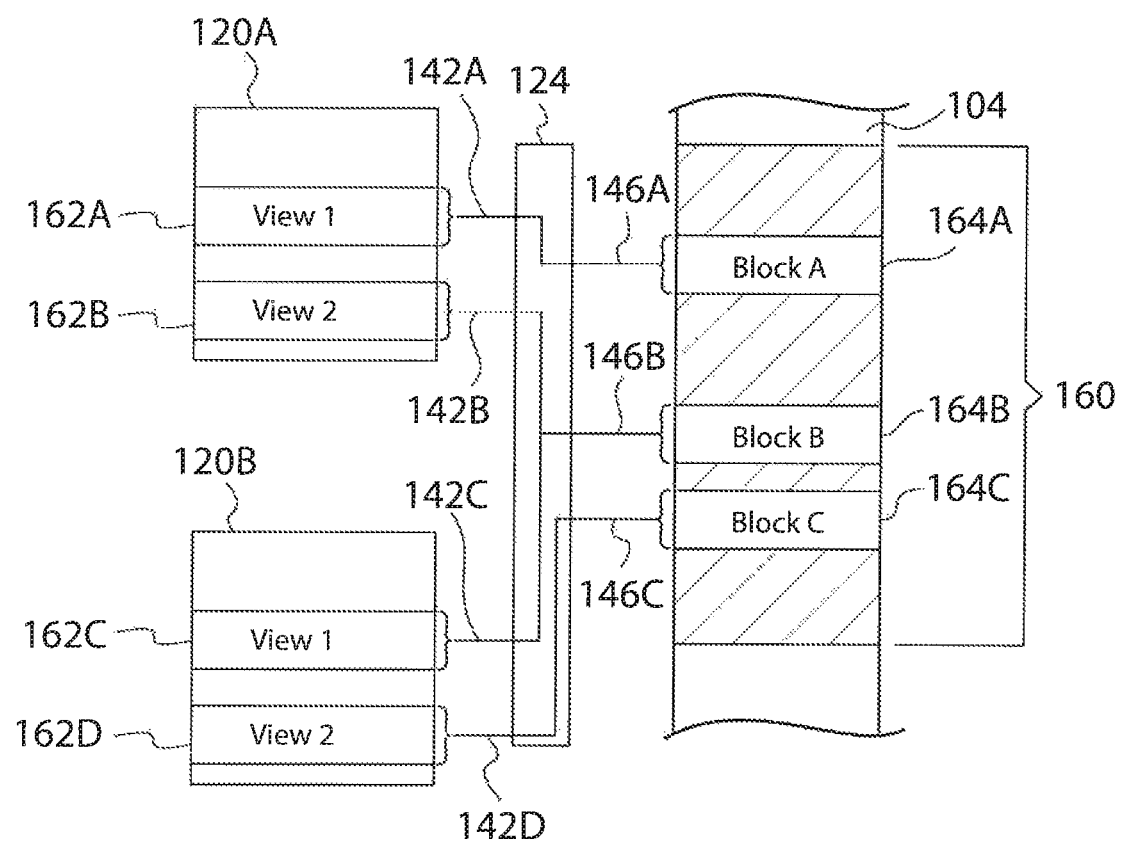
FIG. 3 is a graphical representation of a memory management unit mapping data into memory for access by multiple applications according to a prior art process.

In operation, the data access manager 150 operates transparently to the calling application 120 and to the operating system 122 to control access to data read from data files 140 and mapped into memory 104, Turning initially, to FIG. 3, an illustration of a memory management unit 124 executing according to conventional operation is illustrated. The memory management unit 124 controls access to data stored in memory 104, It is contemplated that the data may be either persisted or non-persisted data. Persisted data is data associated with a file 140 stored in the data storage module 110. The data from the file 140 may be copied to memory 104 either in whole or in part for subsequent access by applications 120 executing on the computing device 100. When the last application 120 is finished with persisted data, the data in memory 104 is written back to the file 140 and saved on the data storage module 110, Non-persisted data is data generated by an application 120 for temporary use and is not stored into the data storage module 110. One or more applications 120 may need access to the data and the memory management unit 124 controls access to the data. When the last application 120 is finished with non-persisted data, the data in memory 104 is lost and the memory locations released by the memory management unit for subsequent use by other applications 120.

To access data from written to memory, the data must first be mapped by the memory management unit 124. According to the example illustrated in FIG. 3, data from a data file 140 is loaded into memory as a memory mapped file 160. A first application 120A issues a request to map data from the data file 140 to memory 104. The memory management unit 124 receives the request and copies the data to memory 104 creating the memory mapped file 160. Although illustrated as a series of consecutive address locations in memory 104, the memory mapped file 160 may be stored in several non-consecutive memory blocks and the memory management unit 124 may maintain a record of the memory blocks associated with the memory mapped file 160. The memory management unit 124 maintains a pointer, or series of pointers, to the physical locations of memory 104 to which the memory mapped file 160 is stored. The memory management unit 124 generates another pointer which it returns to the first application 120A, The first application may use the additional pointer as a file handle to later access the memory mapped file 160.

With reference still to FIG. 3, the first application 120A accesses the memory mapped file 160 using the file handle returned from memory management unit 124 during the initial mapping of the data from the data storage module 110 to memory 104, The first application 120A may request to access the entire mapped file data 160 or to access portions of the file data, referred to as blocks 164 of the file data. Each request to access data may be for read access, write access, or to both read and write the data. The request to access data is illustrated as a view by the calling application 120. In FIG. 3, the first application 120A is requesting access to two different blocks 164 of the memory mapped file 160. A first view 162A is requesting access to a first block 164A, and a second view 162B is requesting access to a second block 164B. To create a view 162 of the data in the memory mapped file 160, the first application 120A generates a request to view the data using the file handle it received when the data was mapped to memory. The memory management unit 124 uses a first memory address 146 to identify the desired block of memory 104 to which the first application 120A is requesting access and returns a second address 142 to the first application. The memory management unit 124 uses the two different addresses to establish a virtual memory map between the application and memory. While the calling application requires access to the data, it can generate subsequent access requests using the second memory address 142 to the memory management unit 124 and the memory management unit 124 retrieves the data from memory 104 using the first memory address 146.

By creating the virtual memory map, the memory management unit 124 is able to manage requests to the same data from multiple applications. According to the example illustrated in FIG. 3, a first application 120A and a second application 120B are both requesting access to the same data file 160. The first application 120A has a first view 162A requesting data from a first block 164A and a second view 162B requesting data from a second block 164B. The second application 120B has a first view 162C, which is also requesting data from the second block 164B, and a second view 162D requesting data from a third block 164C. Because the first and second applications 120A, 120B are the only applications requesting data from the first and third blocks 164, 164I, respectively, the memory management unit 124 may pass the data freely back and forth between the application and memory 104. However, because both applications 120A, 120B are requesting access to the second block 164B, the memory management unit 124 must control access such that one application does not overwrite data while another application is attempting access. By the virtual memory map, the memory management unit 124 assigns a first pointer 142B to the second block 164B for use by the first calling application 120E and a second pointer 142C to the second block 164B for use by the second calling application 120B. The memory management unit 124 knows which application 120 is requesting the data and may provide access accordingly.

Figure 4:
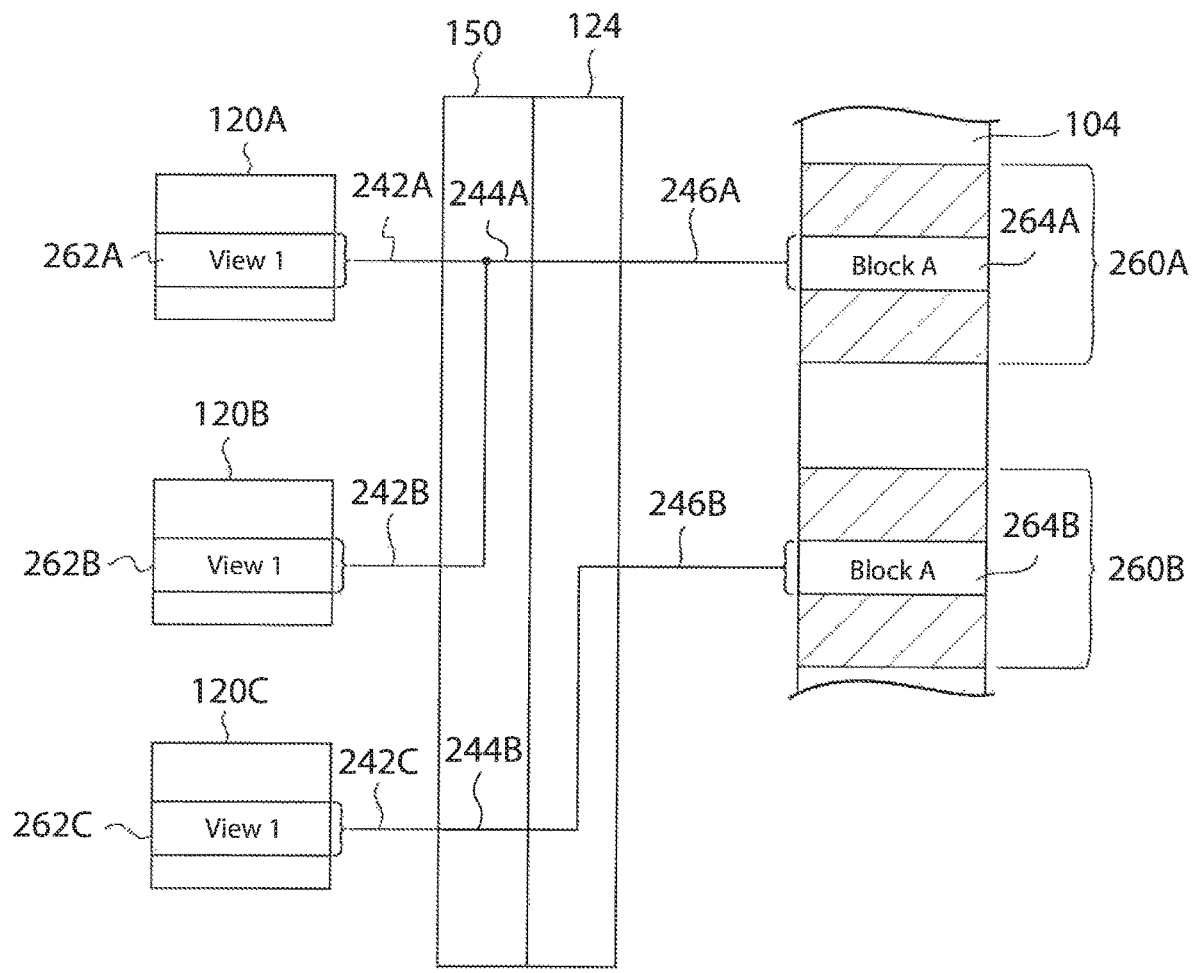
FIG. 4 is a graphical representation of one embodiment of the invention configured to map data into memory for access by multiple applications.

Turning next to FIG. 4, the data access manager 150 is executed by the operating system 122 and is configured to intercept requests generated by applications 120 to either map data to memory 104 or to subsequently access the data mapped to memory. The data access manager 150 is illustrated between each application 120 and the memory management unit 124. As previously indicated, the data access manager 150 operates transparently to the calling application 120 and to the operating system 122 to control access to data read from data files 140 and mapped into memory 104. Each application 120A, 120B, 120C generates the same system call for the corresponding operating system 122 as it would if the data access manager 150 were not present. The data access manager 150 intercepts the system calls and then determines whether the calling application 120 is permitted to access the data in memory 104, When the calling application 120 is permitted to access the data, the data access manager 150 returns a pointer to dear data. When the calling application 120 is not permitted to access the data, the data access manager 150 returns a pointer to encrypted data.

Figure 5:
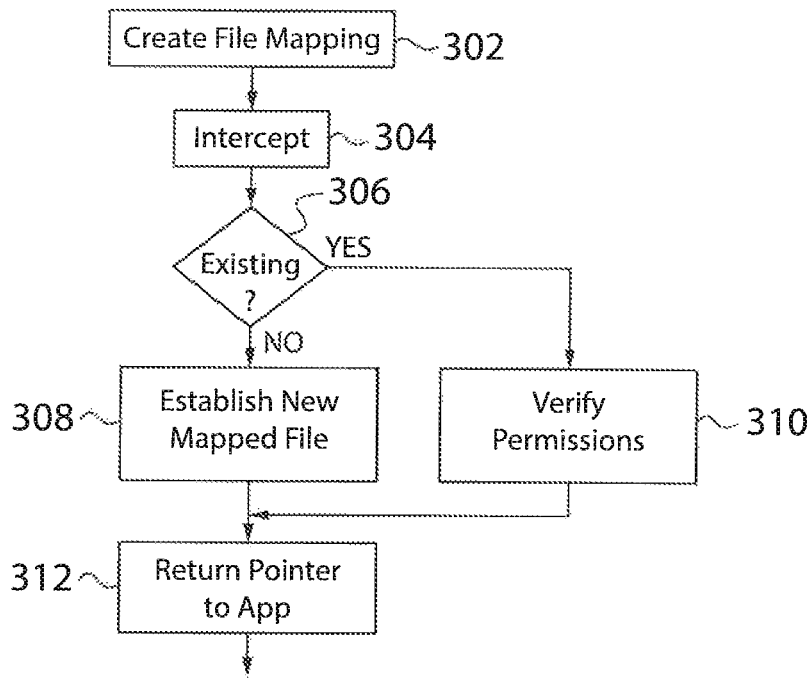
FIG. 5 is a flow diagram of a data access manager mapping data into memory according to one embodiment of the invention.
Figure 6:
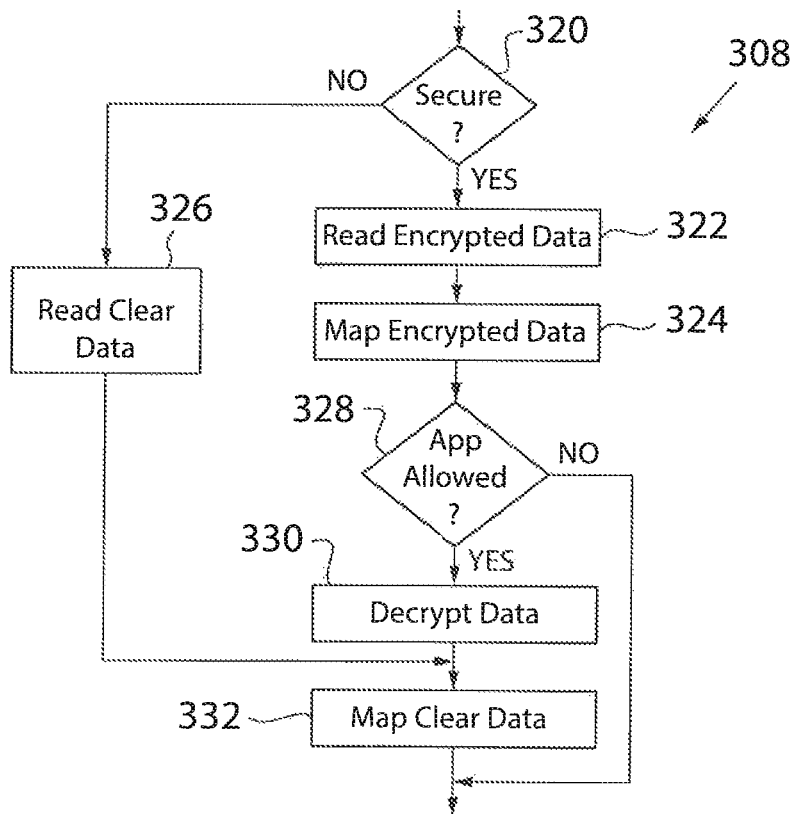
FIG. 6 is a flow diagram of additional steps for the data access manager of FIG. 5 to initially map data into memory.
Figure 7:
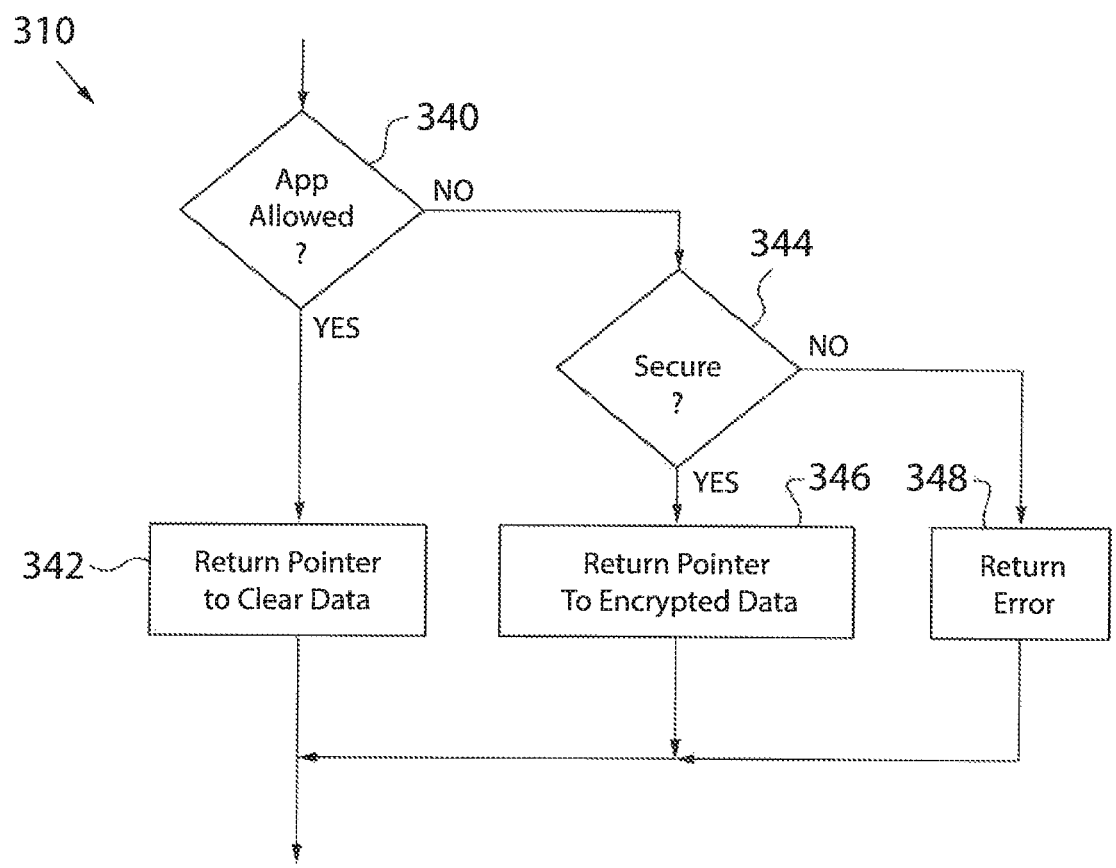
FIG. 7 is a flow diagram of additional steps for the data access manager of FIG. 5 to determine whether a second application has permission to access previously mapped data.

With reference next to FIGS. 5-7, the steps performed by the data access manager 150 according to one embodiment of the invention are illustrated. With reference first to FIG. 5, the application 120 generates a request to create a file mapping as shown in step 302. The request may be for secure data or clear data stored in the data storage module 110 or the request may be to establish a section of memory 104 in which the application may read and write non-persistent data as needed by the application 120. The data access manager 150 is configured to intercept each request to create a file mapping as shown in step 304. After intercepting a request to create a file mapping, the data access manager 150 determines whether a mapping for the requested data already exists, as shown in step 306. If the data is not yet mapped, the data access manager 150 interfaces with the memory management unit 124 to coordinate mapping of the requested data as shown in step 308. If the data requested by the application 120 has already been mapped to memory by another application, the data access manager 150 will verify whether the new application 120 has permission to access the mapped data as shown in step 310. At step 312, the data access manager 150 returns a pointer to clear data, a pointer to encrypted data, or, optionally, the data access manager may pass through an error message to the calling application.

Turning next to FIG. 6, additional detail for the step 308 of establishing a new memory mapped file is illustrated. As an initial step, the data access manager 150 determines whether the requested data is encrypted, as shown in step 320. It is contemplated that the request from the application 120 may indicate whether the data is encrypted and provide an encryption key. If the data requested by the application is not encrypted, the data access manager 150 reads the clear data from the data file 140 on the data storage module 110, as shown in step 326, and interfaces with the memory management unit 124 to map the clear data into memory 104, as shown in step 332. If, however, the data requested by the application is encrypted, the data access manager 150 first reads the encrypted data from the data storage module 110, as shown in step 322, and requests that the encrypted data is stored as a mapped data file 260, as shown in step 324. The data access manager 150 receives a file handle from the memory management unit 124 corresponding to the location of the encrypted data in memory.

The data access manager 150 is also configured to interface with DRM software executing on the computing device 100, As shown in step 328, the data access manager 150 determines whether the calling application 120 is permitted to access the requested data. The data access manager may call the DRM software to determine whether the requested data is protected under the DRM software. If the requested data is a data file 140 for which there are no permissions established, the data access manager 150 proceeds as if the calling application is defined as an allowed application. If the data is non-persistent data utilized by the requesting application 120, the data access manager 150 may similarly pass the request to create a file mapping to the memory management unit 124 such that it may reserve the appropriate blocks of memory 104. If the requested data is a data file 140 for which the DRM software has established permissions, the data access manager 150 examines the permissions to determine whether the requesting application 120 has permission to access the file 140. If the requesting application 120 does not have permission to access the file 140, the data access manager 150 returns a pointer to the encrypted data mapped in step 324. If the requesting application 120 has permission to access the file 140, the data access manager 150 calls a decryption routine at step 330 to decrypt the data. At step 332, the data access manager 150 then requests that the memory management unit 124 store the clear data in memory 104 as a second mapped data file 260. The memory management unit maps the clear data to memory 104 and provides a file handle for the clear data to the data access manager 150. For encrypted data, therefore, the data access manager 150 has received two file handles from the memory management unit 124 where a first file handle identifies secure data mapped to memory 104 and a second file handle identifies clear data mapped to memory. The data access manager 150 provides an additional level of virtual memory abstraction on top of that provided by the memory management unit 124. The data access manager 150 maintains a record of the file handles for both the encrypted data and the clear data and associates both file handles with the requested data. When the calling application. 120 has permission to access the secure data, the data access manager 150 returns the pointer for the clear data to the application. When the calling application 120 does not have permission to access the secure data, the data access manager 150 returns the pointer for the clear to the application. In any event, both the requesting application 120 and the memory management unit 124 are unaware of the presence or intervention by the data access manager.

After a first application 120A has requested that data be mapped to memory 104, a second application 120B may request that the same data be mapped to memory. The second application 120B will also issue a request to create a file mapping, as shown in step 302 of FIG. 5. The data access manager 150 again intercepts the request at step 304. At step 306, the data access manager 150 recognizes that the data has already been mapped to memory 104 and moves to step 310 to determine whether the second application 120B has permission to access the previously mapped data. With reference also to FIG. 7, the steps for determining whether the second application has permission to access previously mapped data are displayed in more detail. The data access manager 150 determines whether the second application 120B has permission to access the mapped data as shown in step 340. Similar to the steps discussed above with respect to determining permission for the first application 120A, the data access manager may call the DRM software to determine whether the requested data is protected under the DRM software. If the requested data is a data file 140 for which there are no permissions established and is accessible by any calling application, the data access manager 150 may simply return a file handle previously established by the memory management unit 124. If the requested data is a data file 140 for which the DRM software has established permissions, the data access manager 150 examines the permissions to determine whether the second requesting application 120B has permission to access the file and, therefore, to access the previously mapped data. If the data access manager 150 determines that the second requesting application 120B does have permission to access the mapped data, the data access manager 150 returns the pointer for the clear data to second calling application, as indicated in step 342. If the data access manager 150 determines that the second requesting application 120B does not have permission to access the mapped data, the data access manager 150 moves to step 344 to determine whether the requested data was encrypted data. If the requested data was encrypted data, the data access manager 150 has previously stored pointers both to clear data and to encrypted data. As illustrated in step 346, when the second calling application 120I does not have permission to access encrypted data, the data access manager 150 will return the pointer for the encrypted data to the second calling application. If the requested data was not encrypted but the second calling application 120B does not have permission to access the mapped data, the data access manager may return an access error, as shown in step 348, to the calling application 120. The access error may be generated by the DRM software when the data access manager 150 checks permissions and the access error may simply be passed through by the data access manager 150 to the calling application.

According to another embodiment of the invention, it is contemplated that the data access manager 150 may be configured to generate a first and second pointer for non-encrypted data as well as for encrypted data. When the data access manager 150 intercepts a request to read non-encrypted data, the data access manager may first request the memory management unit 124 to map data to a first location. It is contemplated that the data access manager 150 may request encryption of the data and store the encrypted data to the first location. Optionally, the data access manager 150 may fill the location with null characters, zeros, or any other data. According to still another option, the data access manager 150 may request the memory management unit 124 map a length of memory corresponding to the requested data but leave the existing contents from prior mapping of data such that the contents of the first location are random. The data access manager 150 then requests the memory management unit 124 to map the clear data to a second location. In this manner, the data access manager 150) may always include pointers to first and second memory mapped data regardless of whether the data was previously encrypted. When a second application 120B requests access, the data access manager 150 then simply passes the first pointer to approved applications and the second pointer to restricted applications.

Turning next to FIG. 4, an example of three applications 120 requesting access to the same encrypted data is illustrated. 4I the illustrated example, the first application 120A and the second application 120B each have permission to access the data, and the third application 120C does not have permission to access the data. The first application 120A generates a request to map the encrypted data to memory 104. The data access manager 150 intercepts the request and determines that the data has not yet been mapped to memory 104. The data access manager 150 requests that the encrypted data be mapped to memory 104. According to the illustrated embodiment, the encrypted data is shown as the second file block 260B in memory 104. The memory management unit 124 returns a file handle 244B to the data access manager corresponding to the physical location 246B in memory 104 at which the encrypted data is mapped. The data access manager 150 decrypts the data and then requests that the memory management unit 124 store the decrypted data to memory 104 as well. The memory management unit 124 returns a file handle 244A to the data access manager corresponding to the physical location 246A in memory 104 at which the clear data is mapped. According to the illustrated embodiment, the decrypted data is shown as the first file block 260A in memory 104. After mapping the decrypted data to memory, the data access manager 150 provides a unique file handle 242A to the first application 120A for subsequent access to the mapped data file 260A.

In the illustrated embodiment, both the first and second applications 120A, 120B seek access to the same block 264A of data. The first application 120A has requested that the data be mapped to memory and subsequently establishes a view of the data block 264A using the first unique file handle 242. A provided by the data access manager 150. The second application 120B subsequently requests the same data to be mapped. The data access manager 150 intercepts this request and determines that it has already caused the data to be stored as the first mapped data file 260A. The data access manager 150 determines that the second application 120B has permission to access the data and returns a second unique file handle 2421 to the second application. The data access manager 150 associates both the first file handle 242A and the second file handle 242B provided to the calling applications with the stored file handle 244A, provided by the memory management unit 124, corresponding to the physical address 246A of the clear data mapped into memory 104. Each calling application is unaware of the presence of the data access manager 150 and uses its respective pointer 242A or 242B to access the mapped data 260A.

The illustrated embodiment further illustrates a third application 1200 attempting to access the data previously mapped by the first application 120A. The data access manager 150 again intercepts the request from the third application to map this data. The data access manager 150 recognizes that the data is already mapped and determines that the third application 120C does not have permission to access the data. Because the data access manager 150 previously stored clear data in a first memory mapped file 260A and the encrypted data in a second memory mapped file 260B, the data access manager 150 has stored a first file handle 244A associated with the first memory mapped file 260A and a second tile handle 244B associated with the second memory mapped file 260B. The data access manager 150 returns a third unique file handle 242C to the third calling application 1200. However, rather than associating the third unique file handle with the clear data, the data access manager 150 associates the third unique file handle 242C with the file handle 244B corresponding to the encrypted data. As a result, when the third application 1200 attempts to access the data, the view 262C of the data for the third application is directed to the encrypted block 264B rather than the decrypted block 264A, preventing the third application 120C from accessing the data. The third application 120C only receives encrypted data rather than being able use the clear data also stored in memory. Thus, the data access manager 150 prevents a subsequent calling application from accessing data that has already been mapped to memory without the proper authorization.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method of managing access to secure data mapped into memory on a computing device, the method comprising the steps of:
    receiving a request to view the secure data mapped into memory, wherein the request to view is received by a data access manager of the computing device and from an application executing on the computing device;
    determining whether the application is allowed to access the secure data with the data access manager;
    transmitting to the application a first pointer assigned by a memory management unit of the computing device, when the application is not allowed to access the secure data; and
    transmitting to the application a second pointer assigned by the memory management unit, when the application is allowed to access the secure data,
    wherein the first pointer directs the application to access the secure data mapped to a first location in the memory and the second pointer directs the application to access clear data mapped to a second location in the memory.

2. The method of claim 1, further comprising initial steps of:
    receiving a request to map the secure data to the memory from a data storage module communicatively coupled to the computing device, wherein the request to map is received by the data access manager from the application;
    determining whether the application is allowed to access the secure data with the data access manager; and
    managing mapping the secure data to the memory with the data access manager when the application is allowed to access the secure data.

3. The method of claim 2, wherein the initial step of managing mapping the secure data to the memory with the data access manager further comprises steps of:
    converting the secure data to the clear data with the data access manager;
    transferring the clear data to the memory management unit;
    mapping the clear data to the second location in the memory with the memory management unit; and
    returning the second pointer directing to the second location in the memory from the memory management unit to the data access manager.

4. The method of claim 2, further comprising steps of:
    transferring the request to map the secure data from the data access manager to the memory management unit when the application is not allowed to access the secure data; and
    receiving the first pointer directing to the first location in the memory at the data access manager from the memory management unit.

5. The method of claim 1, further comprising initial steps of:
    receiving a request to map data to the memory from a data storage module communicatively coupled to the computing device, wherein the request is received by the data access manager from the application;
    identifying a file on the data storage module with the data access manager in which the data to be mapped is located;
    detecting a data rights management metric associated with the file; and determining whether the request to map the data indicates mapping the secure data to the memory.

6. The method of claim 1, further comprising initial steps of:
receiving a request to map the secure data to the memory from a data storage module communicatively coupled to the computing device, wherein the request to map is received by the data access manager from the application;
transmitting a first request to the memory management unit from the data access manager to map the secure data to the first location in the memory;
receiving the first pointer directing to the first location in the memory at the data access manager from the memory management unit;
converting the secure data to the clear data;
transmitting a second request to the memory management unit from the data access manager to map the clear data to the second location in the memory; and
receiving the second pointer directing to the second location in the memory at the data access manager from the memory management unit.

7. The method of claim 1, further comprising steps of:
receiving a second request to view the secure data mapped into memory, wherein the second request is received by the data access manager from a second application executing on the computing device;
determining whether the second application is allowed to access the secure data with the data access manager;
transmitting the first pointer assigned by the memory management unit to direct the second application to access the secure data mapped to the first location of the memory, when the second application is not allowed to access the secure data; and
transmitting the second pointer assigned by the memory management unit to direct the second application to access the clear data mapped to the second location of the memory, when the second application is allowed to access the secure data.

8. A system for managing access to secure data on a computing device, the system comprising:
a memory configured to store data;
a data storage module configured to store a plurality of files, wherein the plurality of files includes at least one application and at least one data file; and
a processor in communication with the memory and the data storage module, wherein the processor is configured to execute the at least one application and to execute a data access manager of the system, and wherein the at least one application and the data access manager are operative to:
generate a request to access data with the at least one application,
transmit the request to access data from the at least one application to a memory management unit,
intercept the request to access data with the data access manager before the request is received by the memory management unit,
determine whether the at least one application is allowed to access the data with the data access manager,
transmit to the at least one application, a first pointer assigned by the memory management unit when the at least one application is not allowed to access the data, and
transmit to the at least one application, a second pointer assigned by the memory management unit when the at least one application is allowed to access the data,
wherein the first pointer directs the at least one application to access secure data mapped to a first location in the memory and the second pointer directs the at least one application to access clear data mapped to a second location in the memory.

9. The system of claim 8, wherein the processor is further configured to:
transmit an initial request from the at least one application to the memory management unit to map secure data to the first location in the memory from the data storage module,
intercept the initial request from the at least one application by the data access manager,
determine whether the at least one application is allowed to access the secure data with the data access manager; and
manage mapping the secure data to the memory with the data access manager when the at least one application is allowed to access the secure data.

10. The system of claim 9, wherein the processor is further configured to manage mapping the secure data to the memory with the data access manager by:
converting the secure data to the clear data;
transferring the clear data to the memory management unit;
mapping the clear data to the second location in the memory with the memory management unit; and
returning the second pointer directing to the second location in the memory from the memory management unit to the data access manager.

11. The system of claim 9, wherein the processor is further configured to:
transfer the initial request to map the secure data from the data access manager to the memory management unit when the at least one application is not allowed to access the secure data, and
receive the first pointer at the data access manager from the memory management unit, the first point directing to the first location in the memory.

12. The system of claim 8, wherein the processor is further configured to:
transmit an initial request from the at least one application to the memory management unit to map data to the memory from the data storage module,
intercept the initial request from the at least one application by the data access manager,
identify a file on the data storage module with the data access manager in which the data to be mapped is located,
using the data access manager, detect a data rights management metric associated with the file, and
determine whether the initial request to map the data indicates mapping the secure data to the memory.

13. The system of claim 8, wherein the processor is further configured to:
receive a request to map the secure data to the memory from the data storage module communicatively coupled to the computing device, wherein the request to map is received by the data access manager from the at least one application;
transmit a first request to the memory management unit from the data access manager to map the secure data to the first location in the memory;
receive the first pointer directing to the first location in the memory at the data access manager from the memory management unit;
convert the secure data to the clear data;

transmit a second request to the memory management unit from the data access manager to map the clear data to the second location in the memory; and receive the second pointer directing to the second location in the memory at the data access manager from the memory management unit.

14. The system of claim 8, wherein the processor is further configured to:

receive a second request to view the secure data mapped into memory wherein the second request is received by the data access manager from a second application executing on the computing device;

determine whether the second application is allowed to access the secure data with the data access manager:

transmit to the second application, the first pointer assigned by the memory management unit to direct the second application to access the secure data mapped to the first location on the memory, when the second application is not allowed to access the secure data; and transmit to the second application, the second pointer assigned by the memory management unit to direct the second application to access the clear data mapped to the second location on the memory, when the second application is allowed to access the secure data.

15. A method of managing access to secure data mapped into memory on a computing device, the method comprising the steps of:

intercepting a request to map the secure data into the memory with a data access manager, wherein the request is transmitted from an application executing on the computing device to a memory management unit;

issuing a first request from the data access manager to the memory management unit to map the secure data into the memory;

receiving a first pointer from the memory management unit with the data access manager, the first pointer directing to a first location in the memory where the secure data is mapped into;

determining that the application is authorized to access the secure data;

converting the secure data to clear data;

issuing a second request from the data access manager to the memory management unit to map the clear data into the memory;

receiving a second pointer from the memory management unit with the data access manager, the second pointer directing to a second location in the memory where the clear data is mapped into;

associating both the first pointer and the second pointer with the requested secure data in the data access manager; and returning the second pointer to the application from the data access manager to direct the application to access the clear data.

16. The method of claim 15, further comprising the steps of:

intercepting a second request to map the secure data into the memory with the data access manager, wherein the second request is transmitted from a second application executing on the computing device to the memory management unit;

determining that the secure data has already been mapped into the memory;

returning the first pointer to the second application to direct the second application to access the secure data, responsive to the second request when the second application is not authorized to access the secure data; and returning the second pointer to the second application to direct the second application to access the clear data, responsive to the second request when the other second application is authorized to access the secure data.

17. The method of claim 15, further comprising the steps of:

intercepting, by the data access manager, a third request and a fourth request to access the secure data, the third request being sent from a third application executing on the computing device to the memory management unit and the fourth request being sent from a fourth application executing on the computing device to the memory management unit;

determining, by the data access manager, that the third application and the fourth application are authorized to access the secure data;

generating, by the data access manager, a first file handler for the third application;

generating, by the data access manager, a second file handler for the fourth application;

associating, by the data access manager, the first file handler and the second file handler with the second pointer; and providing, by the data access manager, the first file handler to the third application and the second file handler to the fourth application, causing the third application and the fourth application to access the clear data mapped to the second location in the memory through the second pointer.

18. The method of claim 17, further comprising the steps of:

determining that the third application and the fourth application are not authorized to access the secure data;

generating, by the data access manager, a third file handler for the third application;

generating, by the data access manager, a fourth file handler for the fourth application;

associating, by the data access manager, the third file handler and the fourth file handler with the first pointer; and providing, by the data access manager, the third file handler to the third application and the fourth file handler to the fourth application, causing the third application and the fourth application to access the secure data mapped to the first location in the memory through the first pointer.

* * * * *